July 13, 1965 K. J. HALL 3,194,347
DISC FOR DISC BRAKES
Filed Sept. 20, 1963 2 Sheets-Sheet 1
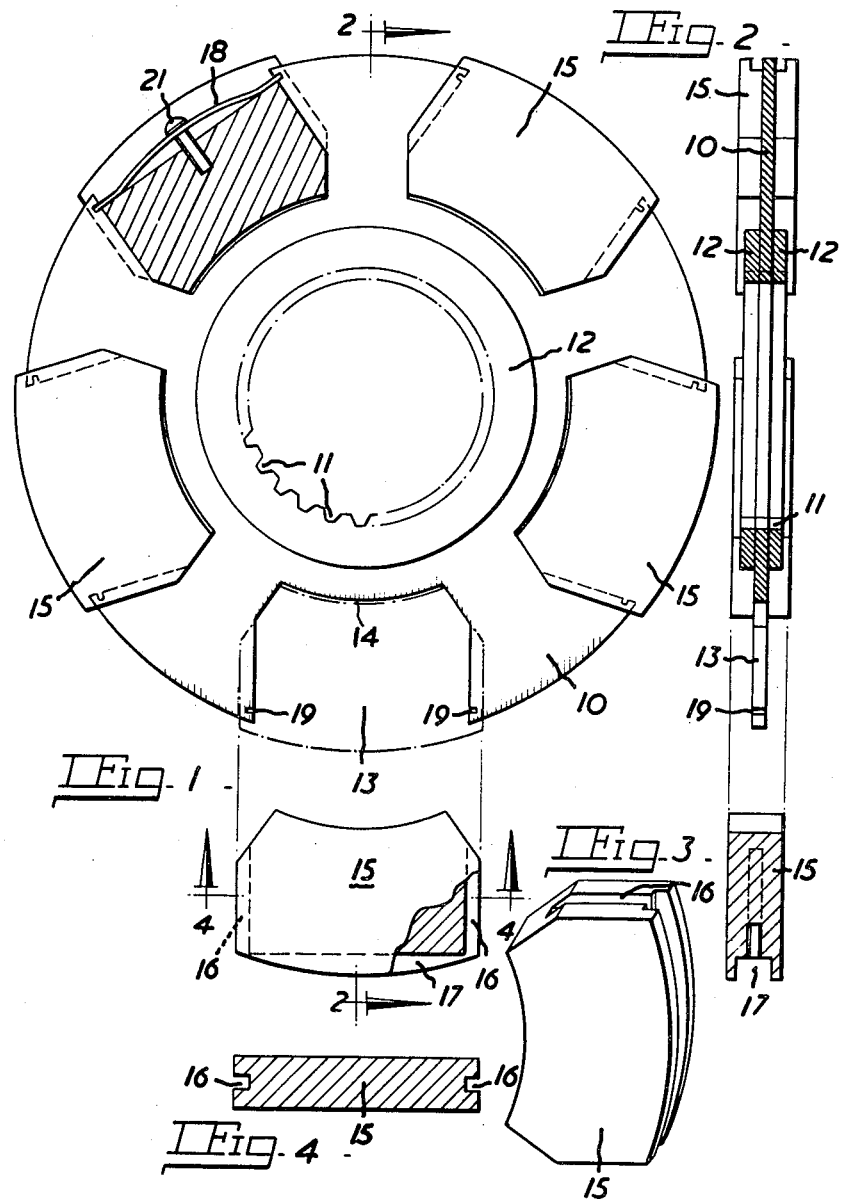
INVENTOR
KENNETH JOHN HALL
BY Scrivener & Parker July 13, 1965  K. J. HALL  3,194,347
DISC FOR DISC BRAKES
Filed Sept. 20, 1963  2 Sheets-Sheet 2

INVENTOR
KENNETH JOHN HALL

BY Scrivener + Parker

3,194,347
DISC FOR DISC BRAKES

Kenneth John Hall, Solihull, England, assignor to Girling Limited, Birmingham, England, a British company
Filed Sept. 20, 1963, Ser. No. 310,212
Claims priority, application Great Britain, Sept. 27, 1962, 36,671/62
3 Claims. (Cl. 188—18)

This invention relates to an improved disc for disc brakes of the kind incorporating one or more rotatable discs carrying on opposite faces rings or pads of friction material adapted to be brought into frictional engagement with relatively stationary or non-rotatable surfaces on opposite sides of the disc.

Usually the rings or pads of friction material are bonded or riveted to opposite faces of the disc, and when the rings or pads are worn out a complete new disc has to be fitted.

According to our invention a disc for a brake of the kind set forth carries friction material which is detachably fitted to the disc to which it is keyed against relative angular movement in any convenient manner.

Then when the friction material is worn it can be replaced without fitting a new disc, and preferably the brake is so designed that the friction material can be replaced without dismantling the brake.

In a preferred arrangement the friction material is in the form of individual angularly spaced pads which are of greater thickness in an axial direction than the disc and are slidably received in angularly spaced notches or gaps in the disc.

Two forms of brake disc in accordance with our invention are illustrated by way of example in the accompanying drawings in which:

FIGURE 1 is an end view of one form of disc with one of the friction pads separated from the disc;

FIGURE 2 is a vertical section on the line 2—2 of FIGURE 1;

FIGURE 3 is a perspective view of a friction pad;

FIGURE 4 is a transverse section of a friction pad on the line 4—4 of FIGURE 1;

Figure 5:
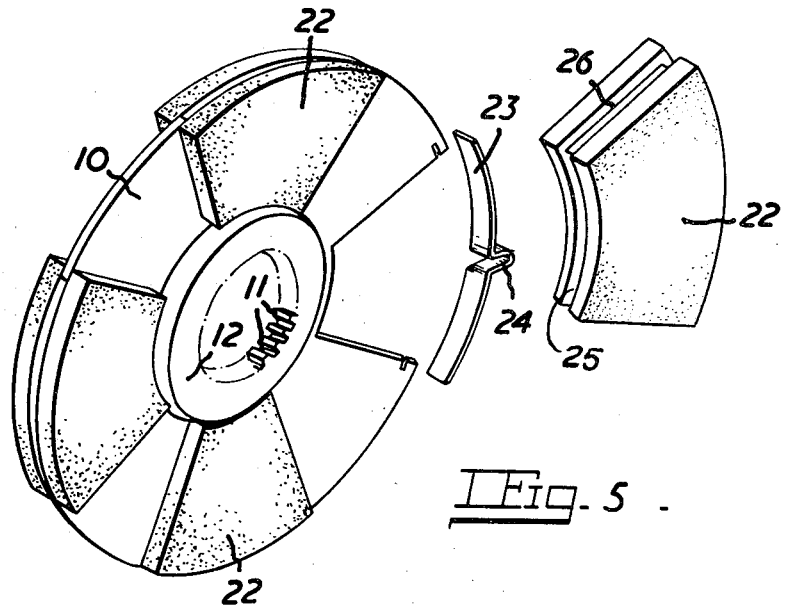
FIGURE 5 is a perspective view of another form of disc with one of the friction pads detached.

In the arrangement shown in FIGURES 1 to 4 the brake disc 10 is a plate or ring of small axial thickness having a central opening provided with splines 11 by means of which it is adapted to be slidably keyed to a rotatable shaft. The axial thickness of the disc around the opening is increased by welding or otherwise securing to opposite sides of the disc a ring 12 so that the splines have a substantial bearing area.

The periphery of the disc has formed in it any convenient number of deep radical notches 13 of which the circumferentially spaced sides are parallel except at their inner ends where they are inwardly inclined. The inner edge 14 of the notch is arcuate and is concentric about the axis of the disc.

Each notch has mounted in it a pad 15 of friction material which is of the same general outline as the notch but is of greater width in a circumferential direction, and is of substantially greater thickness in an axial direction than the disc. The ends of the pads are formed with grooves 16 adapted to engage slidably with the sides of the notches, so that the pads are fitted by simply sliding them into position in the notches, the pads then projecting from both faces of the disc. When in position in the notches the friction pads are effectively keyed against angular movement relative to the disc.

The friction pads can be retained against radial movement outwardly in various ways. In the arrangement shown in FIGURES 1 to 4 a deep straight-based groove 17 in the radially outermost edge of a pad houses a resilient bowed metal clip 18 of which the ends are received in recesses 19 in the ends of a notch. The clip may be secured to the friction pad by a retaining screw 21.

When the friction pads are worn the screws and resilient clips retaining each pad are removed and the pads are slid out of the notches in a radial direction and new pads substituted.

Figure 6:
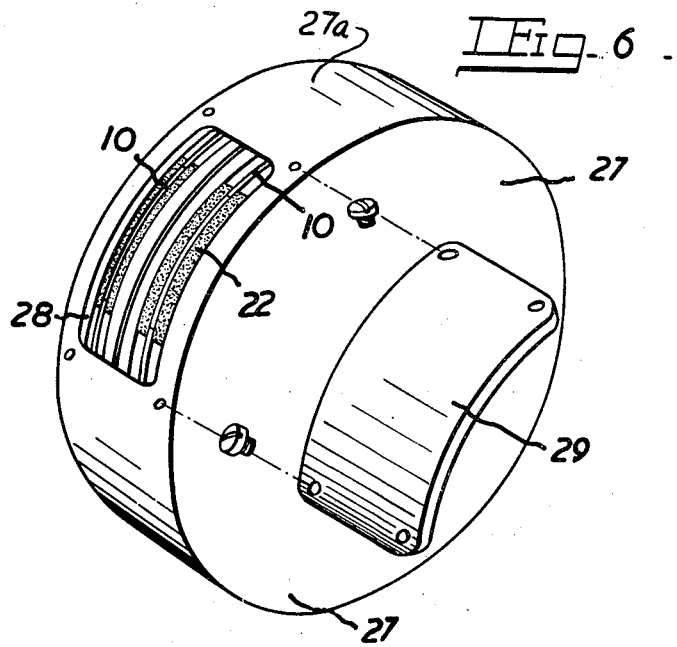
FIGURE 6 is a perspective view of a brake housing enclosing discs of the form shown in FIGURE 5 and having an opening through which friction pads can be inserted and removed.

In the alternative arrangement shown in FIGURES 5 and 6 the notches in the disc are segmental and the friction pads 22 are of complementary outline. The pads are retained in the notches by readily removable resilient strips 23 engaged in recesses in the ends of the notches, the clips preferably having raised central loops 24 for engagement by the fingers or by a tool when the pads have to be renewed.

The pads are shown as having grooves 25 in their arcuate inner ends to engage over the arcuate inner ends of the notches in the disc as well as grooves 26 in their ends for engagement with the ends of the notches.

The arrangement shown in FIGURES 1 to 4 in which the notches have parallel sides is preferred as the drag force on the pads when the brake is applied has no outwardly directed component tending to move the pads in a radially outward direction in the notches and the retaining means only have to deal with the effect of centrifugal force on the pads.

Where the disc or two or more similar discs are enclosed in a stationary housing 27, as shown in FIGURE 6, having an axially extending annular side wall 27a entirely surrounding the disc, the side wall is preferably provided with an opening 28 of sufficient axial and circumferential dimensions to permit the removal and replacement of friction pads without dismantling any other part of the brake, the opening normally being closed by a readily removable cover 29.

In the two forms of disc illustrated and described above the disc is adapted to be mounted on a rotatable shaft but our invention is equally applicable to a disc in the form of a ring which is mounted at its outer periphery on and extends radially inwards from a wheel rim or bell housing, the notches in that case extending radially outwards from the inner periphery of the ring.

It will be appreciated that as there are no rivets in the pads the full pad thickness can be used so that the working life of the pads is greater or thinner pads can be used for a given wear life.

I claim:

1. A brake disc of the type in which a rotatable disc carrying pads of friction material are carried by a rotatable axial shaft and adapted to be brought into engagement with relatively stationary surfaces on opposite sides of the disc to apply the brakes comprising a substantially flat disc, a plurality of angularly spaced notches open at their outer end on the periphery of the disc, said notches have circumferentially spaced substantially radially extending sides, a block of consumable friction material of greater axial thickness than said disc mounted in each of said notches, each of said blocks having a circumferential outer edge part and side edges corresponding to the sides of said notches, each of said side edges being provided with a substantially radially extending groove, each groove receiving a side of the notch in which said block is mounted, and a peripherally disposed releasable clip cooperating with said circumferential outer edge part of each of said blocks and extending between and engaging the sides of said notches adjacent their radial outer ends for preventing movement of said blocks away from said notches, said blocks being removable from and insertable into the notches upon removal of said clip.

2. A disc for a disc brake as in claim 1 wherein the circumferentially spaced sides of the notches are parallel.

3. A brake comprising a stationary housing having an axially extending annular side wall, a rotatable shaft extending centrally through said housing parallel to said side wall, at least one substantially flat brake disc mounted on and driven by said shaft within said housing, said side wall entirely surrounding said disc, a plurality of angularly spaced notches open at their outer end on the periphery of the disc, said notches having circumferentially spaced, substantially radially extending sides, a block of consumable friction material of greater axial thickness than said disc mounted in each of said notches, said block having a circumferential outer edge part and side edges corresponding to the sides of said notches, each of said side edges being provided with a substantially radially extending groove, each grooves receiving a side of the notch in which said block is mounted, peripherally disposed releasable clip means cooperating with the circumferential outer edge part of each of said blocks and with the sides of said notches adjacent their radial outer ends for preventing radial movement of said blocks away from said notches, and an opening in the side wall of said housing having axial and circumferential dimensions sufficient to accommodate passage of said blocks through said opening whereby said clips and said blocks may be removed and inserted into said notches in the disc through said opening.

References Cited by the Examiner

UNITED STATES PATENTS

| | | | |
|---|---|---|---|
| 2,140,887 | 12/38 | Tinnerman | 24—213 |
| 2,180,092 | 11/39 | Oelkers | 188—72 |
| 2,584,707 | 2/52 | Jarvis et al. | 287—119 X |
| 2,683,504 | 7/54 | Martin | 188—72 |
| 2,767,817 | 10/56 | Davis | 188—218 |
| 2,778,451 | 1/57 | Friedman | 188—218 |
| 2,886,355 | 5/59 | Wurzel | 287—119 X |
| 2,893,519 | 7/59 | Friedman | 188—218 |
| 3,033,332 | 5/62 | Geibel | 24—73 X |

FOREIGN PATENTS 1,239,953   7/60   France.

MILTON BUCHLER, *Primary Examiner.*
EUGENE G. BOTZ, *Examiner.*